SIGNALLING CIRCUITS
Filed Nov. 27, 1962
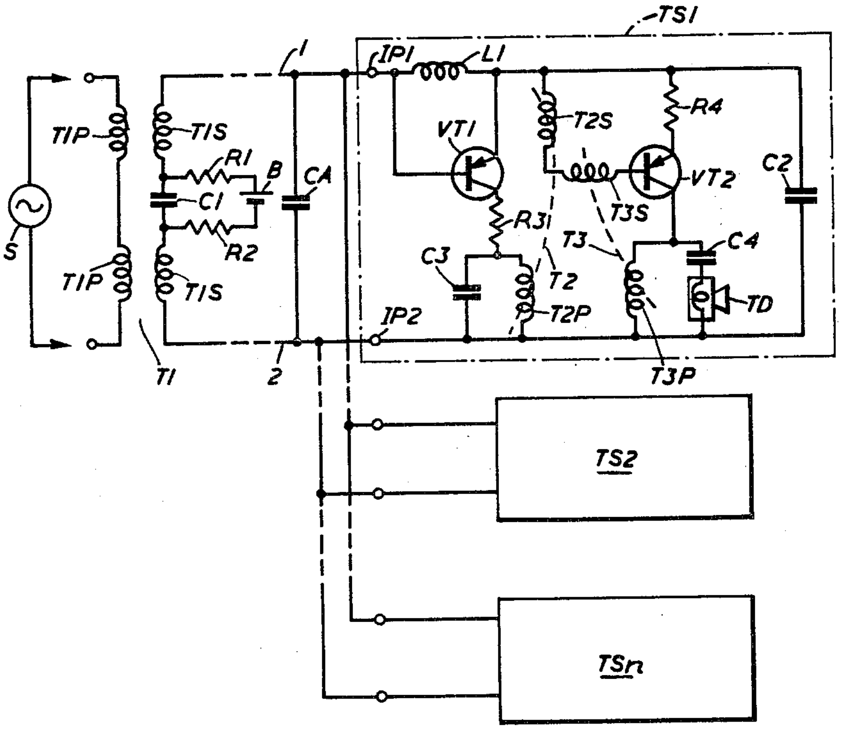
THOMAS H. FLOWERS,
INVENTOR,
BY Hall & Houghton
ATTORNEY United States Patent Office 3,165,591
Patented Jan. 12, 1965

3,165,591
SIGNALLING CIRCUITS
Thomas Harold Flowers, Mill Hill, London, England, assignor to Her Majesty's Postmaster General, London, England
Filed Nov. 27, 1962, Ser. No. 240,346
Claims priority, application Great Britain, Dec. 8, 1961, 44,082/61
10 Claims. (Cl. 179—84)

The present invention relates to signalling circuits and more particularly to signalling circuits which convert an electric signal into an audible signal.

One form of such circuit is suitable for use in telephone subscribers' apparatus connected to an electronic telephone exchange and is known as a tone-sounder. Such a tone-sounder includes an electro-acoustic transducer, e.g. a loud-speaker mechanism, in place of the electric bell commonly employed and the tone-sounder may be actuated by use of a much smaller "ringing" power.

It is advantageous to transmit from the electronic telephone exchange a relatively low audio-frequency signal to actuate the tone-sounder but electro-acoustic transducers of small size are more efficient at higher audio-frequencies. A tone-sounder circuit including a transistor oscillator which has an electro-acoustic transducer coupled to its output circuit and which oscillates at a relatively high audio-frequency under the control of a relatively low audio-frequency is described in my copending U.S. patent application No. 190,378, filed April 26, 1962. However, such a circuit is not suitable for shared service, or party line, working in which two or more subscribers' apparatus are connected across the same subscribers' line. Each subscriber is allocated a different control signal frequency and it is neecssary that the tone-sounder circuit of any one subscriber shall be able to discriminate against the control signals allocated to other subscribers sharing the same line.

According to the present invention an electric signalling circuit operable by concurrent application of an A.C. control signal source and a D.C. power source to the signalling circuit input terminals includes a first transistor, having a collector load impedance including a first parallel resonant circuit tuned to a relatively low audio-frequency, and the base-emitter circuit of the first transistor connected to the signalling circuit input terminals for forward biasing by alternate half-cycles of the A.C. control signals; a transistor oscillator, a second parallel resonant circuit including an electro-acoustic transducer and connected to form a collector load impedance for the transistor oscillator, the second parallel resonant circuit tuned to a relatively high audio-frequency; and the first resonant circuit coupled to the base-emitter circuit of the transistor oscillator whereby the latter oscillates only during conduction of the first transistor in response of A.C. control signals having the said relatively low audio-frequency.

The arrangement is such that when the D.C. power source and an audio-frequency control signal are applied concurrently to the circuit input terminals, the first transistor is driven towards a conductive condition during alternate half-cycles of the control signal. If the control signal frequency corresponds to the resonant frequency of the first resonant circuit, then the first transistor conducts heavily during alternate half-cycles of the control signal and a voltage is applied to the emitter-base circuit of the transistor oscillator sufficient to cause that transistor to oscillate at the resonant frequency of the second parallel resonant circuit and hence causing actuation of the electro-acoustic transducer. By suitable design of the collector circuit of the first transistor, it can be arranged that this transistor conducts sufficiently to cause the transistor oscillator to oscillate only when a control signal having a frequency equal or close to the resonant frequency of the first parallel resonant circuit is applied to the circuit input terminals.

In one particular embodiment of the invention, a reservoir capacitor and an impedance having a low D.C. impedance are connected in series between the circuit input terminals, the first transistor and the transistor oscillator each having their emitter-collector circuits connected across the capacitor. The first resonant circuit includes the primary winding of a first transformer having a secondary winding connected in the base-emitter circuit of the transistor oscillator to provide the coupling between the first resonant circuit and the transistor oscillator. The second parallel resonant circuit includes the primary winding of a second transformer and the electro-acoustic transducer is coupled to that primary winding. The second transformer has a secondary winding connected as a positive feedback winding in the base-emitter circuit of the transistor oscillator. The base-emitter circuit of the first transistor bridges the low D.C. impedance.

In this particular embodiment, the effectiveness of the control signalling circuit in discriminating against other than a desired actuating signal frequency is determined by the Q-factor of the first parallel resonant circuit and the turns ratio of the first transformer. By increasing the Q-factor the discrimination of the signalling circuit can be increased and the first transformer may have a relatively high turns ratio. If the turns ratio of the first transformer is decreased, then the Q-factor of the first parallel resonant circuit also can be decreased but the discrimination of the signalling circuit will be lessened. The precise values of Q-factor of the first resonant circuit and the turns ratio of the first transformer which are selected will, of course, depend upon the design considerations involved in any particular application.

The collector of the first transistor may be connected to the first parallel resonant circuit by an oscillation damping resistor. Conveniently, a resistor may be connected in series with the emitter of the transistor oscillator to prevent self-oscillation of that transistor.

The primary winding of the second transformer may be bridged by a series connected tuning capacitor and electro-acoustic transducer.

Conveniently, the first and second transformers may each be voltage step-down transformers.

Signalling circuits in accordance with the invention may be used as tone-sounder circuits in a telephone system and are particularly suited for use when two or more subscribers' apparatus are connected across the same subscribers' telephone line, i.e. in a party line or shared service system. A separate calling frequency is allotted to each subscriber whose tone-sounder is arranged for actuation by a calling signal having that frequency and to discriminate against calling signals of other subscribers connected to the same line.

By way of example, the invention will be described in greater detail with reference to the accompanying drawing which shows in detail a tone-sounder circuit embodying the invention and its maner of connection to associated telephone exchange equipment. The drawing also shows further tone-sounders diagrammatically and the manner in which they may be connected to a telephone subscriber's line for party line or shared service operation.

In the drawing, a transformer T1 forms part of a transmission bridge in a telephone exchange (or central office) and, in known manner, feeds D.C. currents from a battery B via resistors R1 and R2 and line windings T1S of the transformer T1 to the conductors 1, 2 of a subscriber's telephone line. A capacitor C1 joins the windings T1S of the transformer T1 which also has exchange windings T1P to which an A.C. control signal source S having a siutable frequency and power level may be connected, as will be described later, from within the exchange. The line conductors 1, 2 terminate at the input terminals IP1, IP2 of a tone-sounder apparatus TS1 associated with a subscriber's telephone apparatus. A capacitor CA, which bridges the line conductors 1 and 2, shields the tone-sounder TS1 from adverse effects of transient voltages which may be induced on the line 1, 2 from other lines connected to electromechanical switching equipment.

The tone-sounder TS1 is shown in detail in the drawing within the area enclosed by chain lines and across the input terminals of the tone-sounder a bias inductor L1 having a low D.C. impedance and a reservoir capacitor C2 are connected in series. The inductor L1 and capacitor C2 are so chosen that their resonant frequency lies well below the lowest control signal frequency applied to the subscribers' line by the source S.

The base-emitter path of a switching transistor VT1 is connected across the inductor L1, the emitter of that transistor being connected to the junction of inductor L1 and capacitor C2. The collector electrode of transistor VT1 is connected through an oscillation damping resistor R3 to one end of a parallel resonant circuit comprising a capacitor C3 and the primary winding T2P of a transformer T2; the other end of the parallel resonant circuit is connected to the junction of capacitor C2 and input terminal IP2.

An oscillator transistor VT2 has its emitter connected through a resistor R4 to the junction of inductor L1 and capacitor C2. The collector of transistor VT2 is connected to the junction of capacitor C2 and input terminal IP2 through a circuit comprising the primary winding T3P of a transformer T3 connected in parallel with series connected capacitor C4 and the windings of an electro-acoustical transducer TD. The secondary winding T2S of transformer T2 is connected as a positive feedback winding in series with the secondary winding T3S of transformer T3 between the base of transistor VT2 and the junction of the inductor L1 and the capacitor C2.

The parallel resonant circuit T2P, C3 is arranged to resonate at a relatively low audio-frequency, for example 300 c./s., whilst the parallel resonant circuit T3P, C4, TD is arranged to resonate at a higher audio-frequency, for example 2 kc./s.

In use of the circuit so far described the capacitor C2 normally is charged to the potential of battery B and the base-emitter voltages of transistor VT1 and VT2 are zero and under these conditions the transistors pass little more than collector leakage current (*Ico*).

If, under these conditions, the A.C. signal source S is connected across windings T1P of transformer T1, a control signal is sent to the subscribers' line and a voltage drop occurs across inductor L1. During half-cycles of this signal when line conductor 1 becomes more positive with respect to line conductor 2 the transistor VT1 will remain cut-off. During half-cycles of opposite polarity that transistor will be driven into a conductive condition and will pass current in its collector circuit through resistor R3 and the parallel resonant circuit T2P, C3. It is arranged if the control signal to line from source S has a frequency not close to the resonant frequency of resonant circuit T2P, C3 that the voltage induced across the winding T2S of transformer T2, and connected in the emitter-base circuit of transistor VT2, is not sufficient to drive transistor VT2 into oscillation.

When the source S sends a control signal to line which has a frequency equal to or close to the resonant frequency of resonant circuit T2P, C3 then transistor VT 1 will conduct heavily during alternate half-cycles of the control signal and the resultant voltage induced across winding T2S is arranged to be sufficient to drive transistor VT2 into oscillation at the resonant frequency of its collector resonant circuit, T3P, C4, TD, and transducer TD emits an audible tone at that frequency. At the end of a half-cycle of the control signal during which transistor VT1 conducts, that transistor is switched to a cut-off condition and transistor VT2 ceases to oscillate and reverts to a steady state condition. Resistor R4 provides negative feedback in the emitter circuit of transistor VT2 and reduces the tendency for that transistor to self-oscillate when not driven by the transistor VT1. The driving power for the circuit is derived from capacitor C2 which recharges from battery B during half-cycles of the control signal during which transistor VT1 does not conduct.

It will be appreciated from the above description that the transducer TD of the tone-sounder TS1 emits an audible tone at a relatively high audio-frequency during alternate half-cycles only of an applied control signal which has a frequency corresponding with that to which resonant circuit T2P, C3 is tuned.

The drawing shows also how further tone-sounders TS2 . . . TS*n* may be connected to the line conductors 1, 2 of the same subscribers' line for party working. Tone-sounders TS2 . . . TS*n* are each similar to tone-sounder TS1 except that the parallel resonant circuits T2P, C3 of the tone-sounders are tuned to respective different frequencies corresponding to control signal frequencies allocated to subscribers associated with those tone-sounders. For example, if three tone-sounders are connected to the same subscribers' line, those tone-sounders may be arranged to respond to control signals having respective frequencies of 300 c./s., 400 c./s. and 500 c./s. The resonant frequency of the collector resonant circuit of transistor VT2 may, however, be identical for all the tone-sounders.

The ability of a tone-sounder circuit such as TS1 to discriminate against control signal frequencies other than the frequency to which it is desired the tone-sounder should respond is determined by the resonant circuit T2P, C3 and the turns ratio of transformer T2. If the Q-factor of the resonant circuit T2P, C3 is high, the voltage developed across it will be large and the transformer T2 may have a high voltage step-down turns ratio so that the voltage injected into the base circuit of transistor VT2 will just maintain oscillation of that transistor.

With a smaller turns ratio for transformer T2, the voltage induced across parallel resonant circuit T2P, C3 may be reduced, either by reducing the Q-factor of circuit T2P, C3 or by increasing the value of resistor R3, leading to a decrease in the discrimination of the circuit. Increase of R3 also decreases the current taken from the subscribers' line.

In use of the tone-sounder described above the voltage drop which occurs when a subscriber is connected to the line 1, 2 is such that line currents due to subscribers' speech cannot cause operation of the tone-sounder of another subscriber sharing the line. The precise values of T2P, C3, R1 and turns ratio of transformer T2 will depend upon the design considerations for a particular application.

An example of circuit component values appears in the following table, the circuit being designed to be operated by a control signal of suitable amplitude having a frequency of 300 c./s. to cause transducer TD to emit an audible tone at a frequency of 2 kc./s.

*Table A*

| | | |
|---|---|---|
| R3 | ohms | 33K |
| R4 | do | 10 |
| CA | μf | 0.2 |
| C2 | μf | 2 |
| C3 | μf | 0.56 |
| C4 | μf | 0.115 |
| L1 | h | 1 |
| T2P | h | 0.5 |
| T3P | mh | 50 |
| VT1, VT2 | OC | 203 |

Transformers T2 and T3, primary to secondary turns ratio 20:1.

I claim:

1. An electrical signalling circuit operable by concurrent application thereto of an A.C. control signal source and a D.C. power source, the signalling circuit having a pair of input terminals to which the said A.C. control signal and D.C. power sources can be applied, a relatively low audio-frequency tuned amplifier including a first transistor, a relatively high audio-frequency oscillator including a second transistor, a charge storage device, and means connecting said tuned amplifier, said oscillator and said charge storage device severally across the said input terminals whereby said charge storage device can be charged by said D.C. source to provide a power supply for said oscillator and said tuned amplifier; a first transformer having primary and secondary windings, a first parallel resonant circuit tuned to the said relatively low audio-frequency and including the primary winding of the said first transformer, means connecting the said first parallel resonant circuit to the collector of the first transistor to provide a tuned load for the said tuned amplifier, a base-emitter circuit for the first transistor and means connecting said base-emitter circuit to one of said input terminals for biasing said first transistor so that said tuned amplifier conducts only during alternate half-cycles of A.C. control signals having said relatively low audio-frequency to which said amplifier is tuned; a second transformer having primary and secondary windings, an electro-acoustic transducer, a second parallel resonant circuit tuned to said relatively high audio-frequency and including said primary winding of the second transformer and said transducer, means connecting said second resonant circuit to the collector of said second transistor to provide a tuned load for said oscillator, a base-emitter circuit for said second transistor including said secondary windings of the first and second transformers, the secondary winding of the second transformer providing positive feed-back means between the collector and emitter-base circuits of said second transistor, and the secondary winding on the first transformer providing means coupling said first parallel resonant circuit and the base-emitter circuit of said second transistor for forward biasing thereof to cause oscillation of said second transistor and actuation of the said transducer at said relatively high audio-frequency only during conduction of the tuned amplifier during said forward biasing half-cycles of A.C. control signals having the said relatively low audio-frequency.

2. A circuit according to claim 1, and including a D.C. power source continuously connected to said input terminals and continuously applying D.C. potential across those terminals to charge said D.C. charge storage device.

3. A circuit according to claim 1, including a biasing impedance having a low D.C. impedance connected in the base emitter circuit of said first transistor in series with said one input terminal.

4. A circuit according to claim 1, in which said first and second transformers each provide voltage stepdown as between their respective primary and secondary windings.

5. A circuit according to claim 1, in which said D.C. charge storage device is a reservoir capacitor, and including an inductive bias impedance having a low D.C. resistance connected to the emitter of said first transistor and said one input terminal.

6. In a telephone signalling system, (A) a central office, a plurality of tone-sounder circuits each having a pair of input terminals, said tone sounder circuits forming part of respective subscribers' telephone equipment and each assigned a different calling signal frequency, a telephone line comprising a pair of wires connected at one end, respectively, to said input terminals so that said tone-sounder circuits all are connected in parallel to said line, said wires terminating at their other end at said central office, a D.C. power source located at said central office and continuously connected to said input terminals by way of said telephone line, and located at said central office an A.C. call signal source capable of generating said different frequency call signals, and means for applying said A.C. source to said input terminals by way of said telephone line;

(B) each of said one-sounder circuits comprising, in combination, (i) a tuned amplifier including a first transistor, an oscillator including a second transistor, a charge storage device, and means connecting said tuned amplifier, oscillator and charge storage device severally across the said input terminals of that tone-sounder circuit whereby the charge storage device becomes charged from said D.C. power source to provide a local power supply for said oscillator and tuned amplifier;

(ii) a first transformer having primary and secondary windings, a first parallel resonant circuit including said primary winding of the first transformer, means connecting said first parallel resonant circuit to the collector of said first transistor to provide a tuned load for said tuned amplifier, said first parallel resonant circuit having a relatively low audio-frequency corresponding to the assigned calling frequency of the tone-sounder circuit, a base-emitter circuit for said first transistor and means connecting said base-emitter circuit to one of said input terminals of the tone-sounder circuit to receive signals from said A.C. calling signal source to apply a forward biasing voltage across said base-emitter circuit during alternate half-cycles of the calling signals;

(iii) a second transformer having primary and secondary windings, an electro-acoustic transducer, a second parallel resonant circuit tuned to a relatively high audio-frequency and including both said primary winding of the second transformer and said transducer, means connecting said second resonant circuit to the collector of said second transistor to provide a tuned load for said oscillator, a base-emitter circuit for said second transistor including said secondary windings of the first and second transformers and providing positive feedback means between the collector and emitter-base circuits of said second transistor, and said secondary winding of the first transformer providing means coupling said first parallel resonant circuit and the base-emitter circuit of said second transistor for forward-biasing thereof during conductive periods of the said tuned amplifier to cause oscillation of said second transistor and operation of said transducer at said relatively high audio-frequency;

(C) and means for applying said A.C. calling signal source to said telephone line whereby the said tuned amplifier of one of said tone-sounder circuits conducts only during alternate half-cycles of a calling signal having the frequency assigned to that tone sounder circuit and operates said oscillator and transducer at said relatively high audio-frequency during such conductive periods.

7. A system according to claim 6, wherein each said charge storage device is a reservoir capacitor, and wherein each of said tone-sounder circuits includes an inductive biasing impedance connected in the base-emitter circuit of said first transistor in series with the said one input terminal.

8. A system according to claim 6, wherein each of said first and second transformers provides voltage step-down as between its primary and secondary windings.

9. A system according to claim 6, wherein each said second resonant circuit further includes a tuning capacitor connected in series with said electro-acoustic transducer.

10. A system according to claim 6, wherein in each said tone-sounder circuit the said means connecting said first parallel resonant circuit to the collector of said first transistor comprises an oscillation damping resistor, and a self-oscillation inhibiting resistor is connected in series with the emitter of said second transistor.

References Cited by the Examiner

UNITED STATES PATENTS

| | | | |
|---|---|---|---|
| 2,850,650 | 9/58 | Meacham | 179—84 |
| 2,916,558 | 12/59 | Leman | 179—81 |
| 2,951,909 | 9/60 | Bauman | 179—84 |
| 3,022,493 | 2/62 | Tschumi et al. | 331—117 X |
| 3,026,377 | 3/62 | Sullivan | 179—84 |
| 3,075,048 | 1/63 | Boeryd | 179—84 |

ROBERT H. ROSE, *Primary Examiner.*

WALTER L. LYNDE, *Examiner.*